United States Patent

Killian et al.

[11] Patent Number: 5,129,499
[45] Date of Patent: Jul. 14, 1992

[54] DIAPHRAGM SPRING CLUTCH

[75] Inventors: Daniel L. Killian, Leamington Spa; Keith Manning, Warwick, both of United Kingdom

[73] Assignee: Automotive Products PLC, England

[21] Appl. No.: 694,560

[22] Filed: May 2, 1991

[30] Foreign Application Priority Data

May 4, 1990 [GB] United Kingdom ............... 9010145

[51] Int. Cl.$^5$ ............................................. F16D 13/50
[52] U.S. Cl. ........................... 192/89 B; 192/30 V; 192/109 R
[58] Field of Search ............ 192/89 B, 109 R, 30 V, 192/70.27

[56] References Cited

U.S. PATENT DOCUMENTS

| 2,126,149 | 8/1938 | Spase | 192/70.27 |
| 2,183,000 | 12/1939 | Wolfram | 192/89 B X |
| 2,399,886 | 5/1946 | Odevseff | 192/89 B X |
| 2,630,897 | 3/1953 | Porter | 192/89 B X |
| 2,858,920 | 11/1958 | Doble | 192/89 B |
| 4,375,253 | 3/1983 | Mott | 192/89 B |
| 4,558,771 | 12/1985 | Despres | 192/109 R |
| 4,579,210 | 4/1986 | Meyer et al. | 192/89 B |
| 4,635,776 | 1/1987 | Billet et al. | 192/70.27 |
| 4,883,153 | 11/1989 | Maucher et al. | 192/70.27 |

FOREIGN PATENT DOCUMENTS

| 2750334 | 5/1978 | Fed. Rep. of Germany | 192/89 B |
| 3419833 | 11/1985 | Fed. Rep. of Germany | 192/89 B |
| 3814569 | 11/1989 | Fed. Rep. of Germany | 192/70.27 |
| 854384 | 9/1957 | United Kingdom . | |
| 1024520 | 12/1964 | United Kingdom . | |
| 1201674 | 8/1970 | United Kingdom | 192/89 B |
| 1455559 | 11/1972 | United Kingdom . | |
| 2032017 | 4/1980 | United Kingdom | 192/109 R |
| 2114687 | 2/1982 | United Kingdom . | |

Primary Examiner—Rodney H. Bonck
Attorney, Agent, or Firm—Davis, Bujold & Streck

[57] ABSTRACT

An industrial clutch has a diaphragm spring (40) which over-centers between full engagement and full disengagement. The clutch cover (12) has an abutment (64) which abuts the diaphragm spring (40) when the clutch is disengaged to prevent vibration of the diaphragm spring.

3 Claims, 2 Drawing Sheets

DIAPHRAGM SPRING CLUTCH

This invention relates to diaphragm spring clutches and in particular, to industrial clutches.

Diaphragm spring clutches are well known but the springs are always arranged such that when the clutch is engaged the diaphragm spring is near a fully coned position and during disengagement is moved towards a flat or equilibrium position against the force of the spring. Accordingly, when the clutch is fully disengaged a large force is required to hold the clutch in the disengaged position.

The present invention provides a friction clutch assembly comprising a pressure plate and a driven plate, a diaphragm spring movable to either side of an equilibrium position such that on one side only thereof the diaphragm spring urges the pressure plate towards the driven plate.

Assembly the clutch is made more simple if the diaphragm spring is not attached to, but rests against, either the release bearing or the cover. However, with this arrangement when the clutch is fully disengaged and the diaphragm spring is relaxed, the diaphragm spring tends to vibrate or rattle.

The cover therefore preferably has an abutment thereon for abutting the diaphragm spring only when the clutch is disengaged to inhibit vibration of the diaphragm spring.

Preferred embodiments of the present invention will now be described by way of example only with reference to the accompanying drawings in which.

Figure 1:
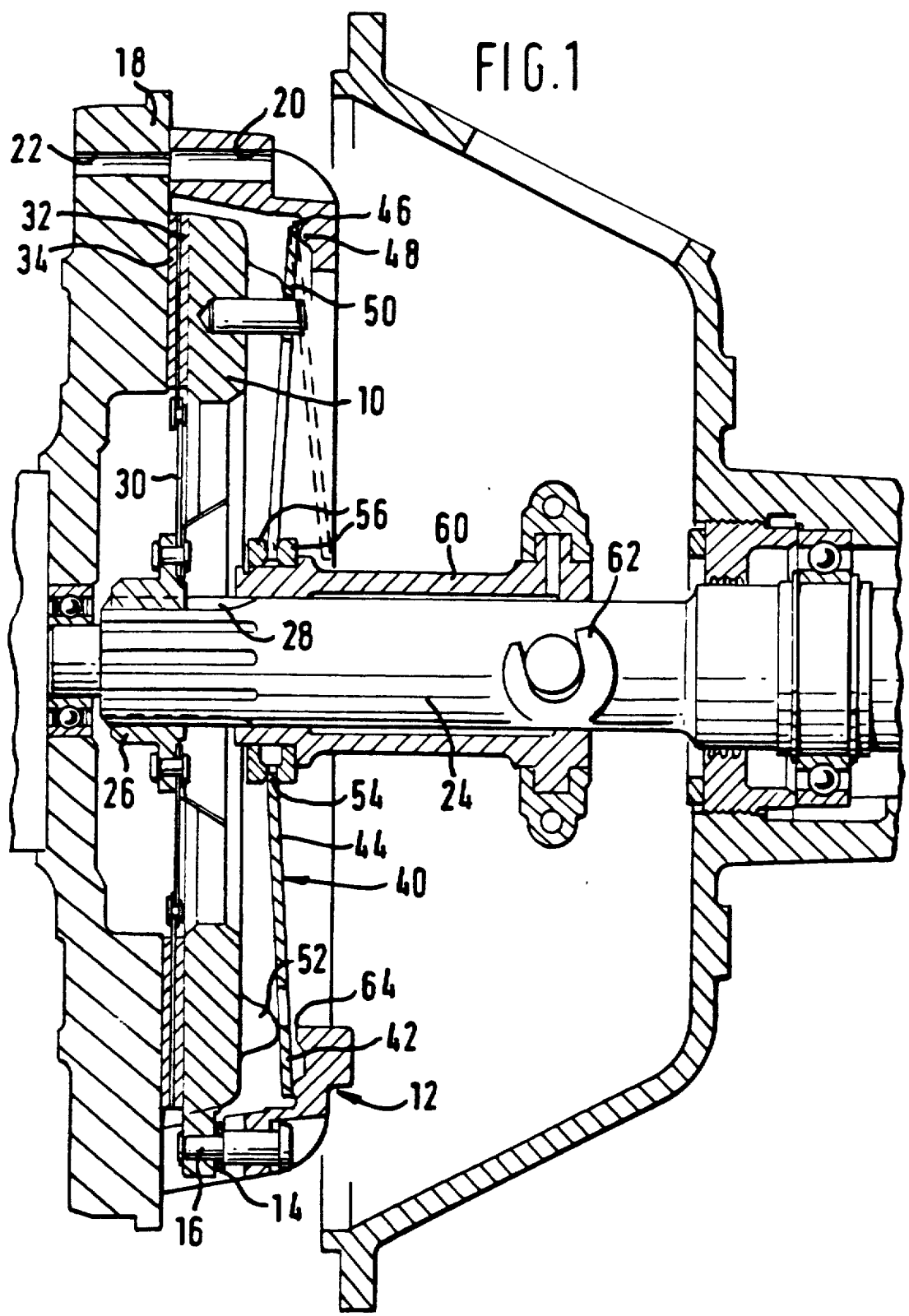
FIG. 1 is a section through a clutch including a clutch assembly according to the invention.

Referring to FIG. 1, a driving member comprising pressure plate 10 is fixed in rotation with a clutch cover 12 by means of drive straps 14 and rivets 16. The cover 12 is fixed in rotation with a flywheel 18 by means of rivets (not shown) passing through aligned bores 20,22 in the cover and flywheel respectively. An output shaft 24 has hub 26 mounted on it, and fixed in rotation with it, by means of splines 28. A driven plate comprises a carrier plate 30, mounted on the hub 26, and having friction facings 32, 34 which are axially between the pressure plate 10 and flywheel 18.

A diaphragm spring 40 comprises an outer annular portion 42 with inwardly extending fingers 44. The diaphragm spring is axially between the cover 12 and the pressure plate 10. An outer edge 46 of the annular portion 42 rests against a first fulcrum formed from a circular ridge 48 on the cover 12. The inner edge 50 of the annular portion 42 rests against a second circular fulcrum formed from a ridge 52 on the pressure plate 10. The inner ends 54 of the fingers 44 are held between two jaws 56 on a release bearing 60. Engaging means comprising annular abutments 64 are formed on the cover 12. The abutments 64 are part circular and are aligned with the ridge 52 on the pressure plate 10 on the opposite side of the diaphragm spring 40 to the pressure plate. The distance between the abutments 64 and the ridge 52 is greater than the thickness of the diaphragm spring 40. The release bearing 60 is movable axially along the output shaft 24 to pivot the diaphragm spring 40 about the fulcrum 48. The release bearing is engaged by a fork 62 on an operating lever (not shown) to enable an operator to engage and disengage the clutch.

Figure 2:
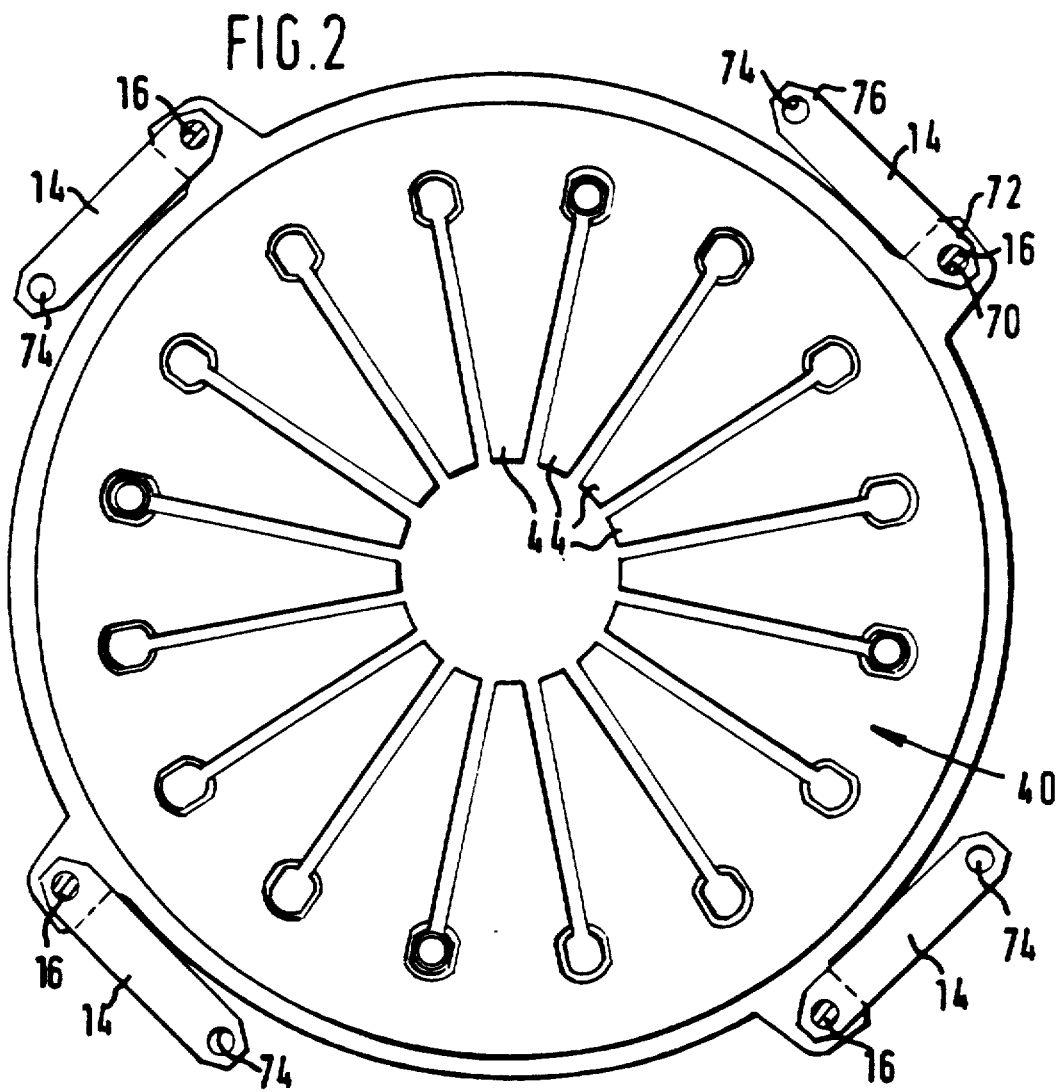
FIG. 2 is an elevation of part of the clutch of FIG. 1.

FIG. 2 shows the diaphragm spring 40, the pressure plate 18, and the drive straps 14, from FIG. 1. The drive straps 14 are attached by holes 70 at one end 72 to the rivets 16, and by holes 74 at the other end 76 to the cover 12. The drive straps urge the pressure plate 10 towards the cover 12.

In FIG. 1 the clutch is shown in the engaged position. The diaphragm spring 40 is between a flat position and a fully coned position and is therefore under tension, tending towards its fully coned position. It therefore presses against the fulcrum 48 on the cover 12 and the fulcrum 52 on the pressure plate 10, urging the pressure plate towards the flywheel 18 and holding the friction facings 32,34 in frictional contact with the pressure plate 10 and flywheel 18.

Figure 3:
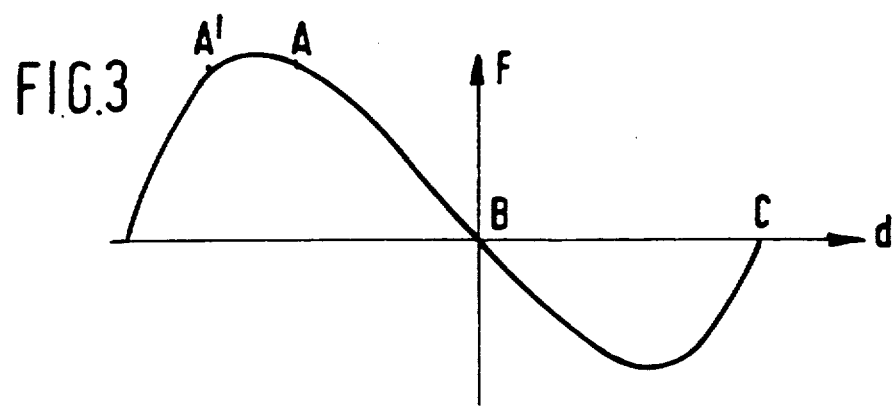
FIG. 3 is a graph showing the characteristic of the diaphragm spring in the clutch of FIG. 1.

In FIG. 3 the vertical axis indicates the clamping force F applied to the pressure plate by the diaphragm spring and the horizontal axis indicated the distance d of the release bearing 60 from a central position in which the diaphragm spring 40 is flat. When the clutch is fully engaged as shown in FIG. 1, and the friction facings 32,34 are new the diaphragm spring is at point A on the graph of FIG. 3. The release bearing is to the left of the central position and the clamping force is positive. When the friction facings 32,34 are worn, the pressure plate 10 can move closer to the flywheel 18, and when the clutch is fully engaged the release bearing 60 can move to a position represented by point A'.

To disengage the clutch the release bearing 60 is moved to the right by an operator against the force of the diaphragm spring 40, until the diaphragm spring becomes flat and is an unstable equilibrium. This is represented by point B in FIG. 3. At that point the diaphragm spring over-centres and forces the release bearing further away from the flywheel 18 until the diaphragm spring is relaxed in a fully coned position, and comes to rest against the abutments 64. This is represented by point C in FIG. 3. The drive straps 14 urge the pressure plate 10 to follow the movement of the diaphragm spring and to release the driven plate 30, 32, 34. At point C the drive straps 14 still urge the pressure plate 10 towards the cover 12, holding the diaphragm spring against the abutments 64. The fulcrum 48 and abutments 64 are arranged such that when the diaphragm spring is in its fully coned position (position C) the diaphragm spring is in contact with the fulcrum 48 and the abutments 64.

The position of the fulcrum 48 and abutment 64 could be different from those described above. The abutment need not be aligned with the ridge 52. The diaphragm spring can extend radially beyond the fulcrum, the abutment being radially outside the fulcrum.

In a push type clutch, the fulcrum is on the side of the diaphragm spring nearest the pressure plate and the pressure plate contacts the diaphragm spring radially outside the fulcrum. The clutch is disengaged by moving the release bearing towards the flywheel. In such a clutch the abutment can be situated opposite the point of contact between the pressure plate and the diaphragm spring, as in FIG. 1.

In the embodiment of FIG. 1, of any of the above alternatives, the abutment can be arranged to engage the diaphragm spring before it reaches its fully coned position. Also instead of being formed as part of the cover, the abutment can be formed from elastomeric material mounted on the cover.

We claim:

1. A friction clutch assembly comprising a cover having a radially extending end wall having thereon on one side a radially outer annular fulcrum and a radially inner abutment, a pressure plate arranged on said one axial side of the cover end wall and being rotationally fixed to the cover by drive straps which urge the pressure plate towards said end wall, a diaphragm spring located between said end wall and the pressure plate and having its outer peripheral edge pivoting on said annular fulcrum, the diaphragm spring being coned away from said end wall to urge the pressure plate towards a driven plate in a clutch engaged condition, said diaphragm spring being movable through an equilibrium position to be coned towards the end wall in a clutch disengaged condition, and said diaphragm spring in the clutch disengaged position being relaxed and being biased into abutment with said radially inner abutment by the pressure plate to inhibit vibration of the relaxed diaphragm spring.

2. An assembly as claimed in claim 1 wherein the radially inner abutment on the end wall comprises a plurality of partially circular abutments.

3. An assembly according to claim 1 wherein said pressure plate has a protrusion located to engage said diaphragm spring and said protrusion is coaxially aligned with said radially inner abutment on said end wall.

* * * * *